United States Patent
Aronstam et al.

(10) Patent No.: US 7,823,689 B2
(45) Date of Patent: Nov. 2, 2010

(54) CLOSED-LOOP DOWNHOLE RESONANT SOURCE

(75) Inventors: Peter S. Aronstam, Houston, TX (US);
Larry Watkins, Houston, TX (US);
Roger Fincher, Conroe, TX (US);
James E. Goodson, Jr., Porter, TX (US);
Michael Carmody, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 1858 days.

(21) Appl. No.: 10/643,030

(22) Filed: Aug. 18, 2003

(65) Prior Publication Data

US 2004/0112594 A1 Jun. 17, 2004

Related U.S. Application Data

(63) Continuation-in-part of application No. 10/366,841, filed on Feb. 14, 2003, now Pat. No. 6,795,373, and a continuation-in-part of application No. 10/444,857, filed on May 23, 2003, now Pat. No. 6,926,089, which is a continuation of application No. 09/916,617, filed on Jul. 27, 2001, now Pat. No. 6,568,470.

(51) Int. Cl.
*G04V 1/40* (2006.01)
(52) U.S. Cl. .................. 181/106; 181/108; 181/101; 181/113; 181/119; 367/25; 367/83
(58) Field of Classification Search .......... 181/106, 181/108, 101, 102, 113, 111, 112, 119, 104; 166/249, 65.1, 65.5; 175/57, 107, 339; 367/25, 367/83, 84, 85
See application file for complete search history.

(56) References Cited

U.S. PATENT DOCUMENTS 2,281,751 A * 5/1942 Cloud .................. 181/106

(Continued)

FOREIGN PATENT DOCUMENTS

EP 0950795 A 10/1999

(Continued)

OTHER PUBLICATIONS

"Commercial Magneto-Rheological Fluid Devices," Authors: J.D. Carlson, D.M. Catanzarite and K.A. St. Clair; 5$^{th}$ Int. Conf. On Electro-Rheological, Magneto-Rheogical Suspensions and Associated Technology, Sheffield, Jul. 10-14, 1995.

(Continued)

*Primary Examiner*—Jeffrey Donels
*Assistant Examiner*—Forrest M Phillips
(74) *Attorney, Agent, or Firm*—Cantor Colburn LLP

(57) ABSTRACT

An apparatus for generating seismic body waves in a hydrocarbon reservoir includes a closed-loop borehole source having a resonant cavity for generating resonant energy, a drive source and a control unit. The drive source injects pressure pulses to the resonant cavity at a predetermined or selectable pressure and frequency. The fluid circulates between the cavity and the drive source in a closed-loop fashion. In another embodiment, the borehole source utilizes a smart or controllable material that is responsive to an applied excitation field. The cavity includes an excitation coil for providing an excitation field that changes a material property of the smart fluid. The control unit is programmed to adjust operating parameters to produce seismic waves having a selected frequency and amplitude. In one embodiment, a control unit adjusts operating parameters in response to measured parameters of interest or surface commands.

36 Claims, 8 Drawing Sheets

U.S. PATENT DOCUMENTS

| | | | | |
|---|---|---|---|---|
| 2,417,850 A | | 3/1947 | Winslow | 175/320 |
| 2,575,360 A | | 11/1951 | Rabinow | 192/21.5 |
| 3,578,081 A | * | 5/1971 | Bodine | 166/249 |
| 3,718,205 A | * | 2/1973 | Fair et al. | 367/189 |
| 3,909,776 A | * | 9/1975 | Broding et al. | 181/119 |
| 4,040,003 A | * | 8/1977 | Beynet et al. | 367/84 |
| 4,323,991 A | * | 4/1982 | Holmes et al. | 367/83 |
| 4,345,650 A | * | 8/1982 | Wesley | 166/249 |
| 4,393,932 A | * | 7/1983 | Bodine | 166/249 |
| 4,458,227 A | * | 7/1984 | Petersen | 335/222 |
| 4,671,379 A | * | 6/1987 | Kennedy et al. | 181/106 |
| 4,699,240 A | * | 10/1987 | Dedole | 181/113 |
| 4,722,417 A | | 2/1988 | Selsam | 181/119 |
| 4,815,557 A | * | 3/1989 | Duwe | 181/106 |
| 4,834,210 A | * | 5/1989 | Kennedy | 181/106 |
| 4,869,338 A | * | 9/1989 | Wiggins et al. | 181/106 |
| 4,991,685 A | * | 2/1991 | Airhart | 181/106 |
| 4,992,360 A | | 2/1991 | Tsuruta et al. | 430/556 |
| 4,993,001 A | * | 2/1991 | Winbow et al. | 367/144 |
| 5,031,717 A | * | 7/1991 | Hardee et al. | 181/106 |
| 5,042,611 A | * | 8/1991 | Howlett | 181/104 |
| 5,080,189 A | * | 1/1992 | Cole | 181/106 |
| 5,109,698 A | * | 5/1992 | Owen | 73/632 |
| 5,167,850 A | | 12/1992 | Shtarkman | 252/62.52 |
| 5,189,263 A | * | 2/1993 | Bearden | 181/113 |
| 5,268,537 A | * | 12/1993 | Winbow et al. | 181/106 |
| 5,277,282 A | | 1/1994 | Umemura | 188/290 |
| 5,284,330 A | | 2/1994 | Carlson et al. | 267/140.14 |
| 5,406,530 A | | 4/1995 | Yamamoto | 367/57 |
| 5,452,745 A | * | 9/1995 | Kordonsky et al. | 137/807 |
| 5,467,322 A | * | 11/1995 | Walter | 367/142 |
| 5,510,582 A | * | 4/1996 | Birchak et al. | 181/102 |
| 5,584,489 A | | 12/1996 | Abrams et al. | 277/123 |
| 5,635,685 A | * | 6/1997 | Tierce et al. | 181/106 |
| 5,724,311 A | * | 3/1998 | Laurent et al. | 367/57 |
| 5,741,962 A | * | 4/1998 | Birchak et al. | 73/152.16 |
| 5,834,710 A | * | 11/1998 | Finnestad | 181/106 |
| 5,852,262 A | * | 12/1998 | Gill et al. | 181/106 |
| 5,886,255 A | | 3/1999 | Aronstam | 73/152.01 |
| 5,941,313 A | | 8/1999 | Arizmendi | 166/387 |
| 5,956,951 A | * | 9/1999 | O'Callaghan | 60/326 |
| 6,094,401 A | * | 7/2000 | Masak et al. | 367/84 |
| 6,158,470 A | * | 12/2000 | Ivers et al. | 137/807 |
| 6,244,375 B1 | | 6/2001 | Norris | 181/102 |
| 6,257,356 B1 | * | 7/2001 | Wassell | 175/61 |
| 6,279,653 B1 | * | 8/2001 | Wegener et al. | 166/249 |
| 6,296,088 B1 | * | 10/2001 | Carlson | 188/267.2 |
| 6,366,531 B1 | * | 4/2002 | Varsamis et al. | 367/26 |
| 6,433,991 B1 | * | 8/2002 | Deaton et al. | 361/191 |
| 6,456,566 B1 | * | 9/2002 | Aronstam | 367/86 |
| 6,568,470 B2 | * | 5/2003 | Goodson et al. | 166/66.5 |
| 6,662,899 B2 | * | 12/2003 | Norris et al. | 181/102 |
| 6,705,396 B1 | * | 3/2004 | Ivannikov et al. | 166/249 |
| 6,747,914 B2 | * | 6/2004 | Aronstam | 367/31 |
| 6,795,373 B1 | * | 9/2004 | Aronstam | 367/85 |
| 6,837,332 B1 | * | 1/2005 | Rodney | 181/105 |
| 6,926,089 B2 | * | 8/2005 | Goodson et al. | 166/387 |
| 6,961,283 B2 | * | 11/2005 | Kappius et al. | 367/43 |
| 7,082,078 B2 | * | 7/2006 | Fripp et al. | 367/83 |
| 7,114,581 B2 | * | 10/2006 | Aronstam et al. | 175/57 |
| 7,292,943 B2 | * | 11/2007 | Elder et al. | 702/14 |
| 2001/0040030 A1 | * | 11/2001 | Lerche et al. | 166/63 |
| 2003/0019622 A1 | * | 1/2003 | Goodson et al. | 166/66.5 |
| 2003/0066650 A1 | * | 4/2003 | Fontana et al. | 166/358 |
| 2003/0192687 A1 | * | 10/2003 | Goodson et al. | 166/65.1 |
| 2004/0112594 A1 | * | 6/2004 | Aronstam et al. | 166/249 |
| 2005/0226098 A1 | * | 10/2005 | Engels et al. | 367/31 |
| 2005/0258090 A1 | * | 11/2005 | Gernon | 210/222 |
| 2007/0010119 A1 | * | 1/2007 | Hall et al. | 439/310 |
| 2007/0029112 A1 | * | 2/2007 | Li et al. | 175/26 |
| 2007/0045006 A1 | * | 3/2007 | Krueger et al. | 175/25 |
| 2007/0107911 A1 | * | 5/2007 | Miller et al. | 166/380 |
| 2007/0221408 A1 | * | 9/2007 | Hall et al. | 175/57 |
| 2007/0221412 A1 | * | 9/2007 | Hall et al. | 175/107 |
| 2007/0246263 A1 | * | 10/2007 | Reitsma | 175/38 |

FOREIGN PATENT DOCUMENTS

| | | | |
|---|---|---|---|
| WO | WO9750077 | * | 12/1997 |

OTHER PUBLICATIONS

"Properties and Applications of Commercial Magnetorheological Fluids," Authors: Mark R. Jolly Jonathan W. Bender and J. David Carlson, SPIE 5$^{th}$ Annual Int. Symposium on Smart Structures and Materials, San Diego, CA, Mar. 15, 1998.

Engineering Note, Designing with MR Fluids, Lord Corporation, Thomas Lord Research Center, May 1998.

* cited by examiner

CLOSED-LOOP DOWNHOLE RESONANT SOURCE

CROSS-REFERENCE TO RELATED APPLICATIONS

This application is a continuation-in-part of U.S. patent application Ser. No. 10/366,841, filed on Feb. 14, 2003 now U.S. Pat. No. 6,795,373. This application is also a continuation-in-part of U.S. patent application Ser. No. 10/444,857 filed on May 23, 2003 now U.S. Pat. No. 6,926,089, which is a continuation of U.S. application Ser. No. 09/916,617 filed on Jul. 27, 2001, now U.S. Pat. No. 6,568,470.

FIELD OF THE INVENTION

The invention relates to the downhole generation of seismic waves for use in investigation and monitoring of earth formation reservoir characteristics surrounding a well borehole. In one aspect, the invention relates to a method and system for producing seismic energy using a seismic source using a closed fluid loop. In another aspect, the invention relates to a closed-loop seismic source employing materials responsive to an excitation signal. The present invention also relates to using seismic body waves radiated by seismic sources to investigate and monitor hydrocarbon or other mineral deposits over the productive lifetime of a producing reservoir.

BACKGROUND OF THE INVENTION

In the oil and gas industry, geophysical prospecting techniques are commonly used to aid in the search for and evaluation of subterranean hydrocarbon deposits. Generally, a seismic energy source is used to generate a seismic signal which propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

Geophysical surveys are used to discover earth structure, mineral deposits, and the subsurface extent of mineral deposits such as oil, natural gas, water, sulphur, etc. Geophysical methods may also be used to monitor changes in the deposit, such as depletion resulting from production of the mineral over the economic lifetime of the deposit. The usefulness of a geophysical study depends on the ability to quantitatively measure and evaluate some geophysical analogue of petrophysical parameters related to the presence of the mineral under consideration.

Changes in the hydrocarbon reservoir over the production life of the reservoir may be detected by changes in a parameter of interest as indicated by temporal changes in seismic body wave characteristics or attributes. The parameter of interest may be any seismic attribute, individually or in combination, of detected seismic body waves which have traversed the reservoir. Seismic attributes are well known in the art. Some examples of attributes are seismic impedance, amplitude, attenuation, frequency, phase, polarity, velocity, dip, azimuth, envelope, etc.

Seismic methods may be applied to production-management monitoring as well as to exploration of hydrocarbon reservoirs. As is well known to geophysicists, an acoustic seismic source at or near the surface of the earth is caused periodically to radiate a seismic wavefield into the earth at each of a plurality of source survey stations. Acoustic seismic sources are usually of the impulsive or swept-frequency type. An impulsive source produces a very sharp minimum-phase wave of very short duration and that somewhat simulates the generation of an impulse. An explosion is an example of such a source.

The swept-frequency or chirp type seismic source may generate a controlled wavetrain to form a relatively long pilot signal such as 2 to 30 seconds to assure sufficient energy is imparted to the earth. The swept-frequency or chirp type source method relies on signal compression to compress the signal and ensure sufficient vertical resolution to resolve the position of subsurface reflectors. Signal compression generally is called deconvolution, with many techniques well known in the art of seismic data processing. Deconvolution of sweep or chirp signals compresses the source signal into a much shorter signal representative of a subsurface reflective boundary. The accuracy and effectiveness of any deconvolution technique is directly related to how well the source signal is known or understood. Most deconvolution operators are derived from statistical estimates of the actual source waveform.

Swept frequency type sources emit energy in the form of a sweep of regularly increasing (upsweep) or decreasing (downsweep) frequency in the seismic frequency range. In addition to upsweeps and downsweeps, various alternative forms of swept frequency signals are well known in the art, for example, so called random sweeps, pseudo-random sweeps or nonlinear sweeps. In a nonlinear sweep, more time may be spent sweeping high frequencies than low frequencies to compensate for high-frequency attenuation in the signal's travel through the earth, or to shape to a desired wavelet. The vibrations are controlled by a control signal, which can control the frequency and phase of the seismic signals.

The acoustic seismic wavefield radiates in all directions to insonify the subsurface earth formations. The radiated wavefield energy is reflected back to be detected by seismic sensors (receivers) located at designated stations also usually located at or near the surface of the earth, but which may also be in the subsurface, for example, in well boreholes (herein, also called wellbores). The seismic sensors convert the mechanical earth motions, due to the reflected wavefield, to electrical signals. The resulting electrical signals are transmitted over a signal-transmission link of any desired type, to instrumentation, usually digital, where the seismic data signals are archivally stored for later processing.

The travel-time lapse between the emission of a wavefield by a source and the reception of the resulting sequence of reflected wavefields by a receiver is a measure of the depths of the respective earth formations from which the wavefield was reflected. The relative amplitudes of the reflected wavefields may be a function (an analogue) of the density and porosity of the respective earth formations from which the wavefields were reflected as well as the formations through which the wavefields propagated. The phase angle and frequency content of returned signals in the reflected wavefields may be influenced by formation fluids, the sought-for minerals or other formation characteristics.

The processed seismic data associated with a single receiver are customarily presented as a one-dimensional time scale recording displaying rock layer reflection amplitudes as a function of two-way wavefield travel time. A plurality of seismic traces from a plurality of receivers sequentially distributed along a line of survey at intervals, such as 25 meters, may be formatted side by side to form a two dimensional (2-D) analog model of a cross section of the earth. Seismic sections from a plurality of intersecting lines of survey distributed over an area of interest provide three-dimensional (3-D) imaging. A series of 3-D surveys of the same region made at successive time intervals, such as every six months, would constitute a 4-D, time-lapse study of the subsurface that would be useful to monitor, for example, the fluid-depletion rate of hydrocarbon reservoir.

From the above considerations, it is reasonable to expect that time-lapse seismic monitoring, that is, the act of monitoring the time-varying characteristics of seismic data associated with a mineral deposit such as a hydrocarbon reservoir of oil or gas over a long period of time, would allow monitoring the depletion of the fluid or mineral content, or the mapping of time-varying attributes such the advance of a thermal front in a steam-flooding operation.

Successful time-lapse monitoring requires that differences among the processed data sets must be attributable to physical changes in the petrophysical characteristics of the deposit. This criterion is severe because changes in the data-acquisition equipment and changes in the processing algorithms, inevitable over many years may introduce differences among the separate, individual data sets from surveys that are due to instrumentation, not the result of dynamic reservoir changes.

In particular, using conventional surface exploration techniques, long-term environmental changes in field conditions such as weather and culture may affect the outcome. If time-lapse tomography or seismic monitoring is to be useful for quantitative hydrocarbon reservoir monitoring, instrumentation and environmental influences that are not due to changes in reservoir characteristics must be transparent to the before and after seismic data sets. Successful time-lapse tomography requires careful preliminary planning.

One way to avoid many time-dependent environmental changes and updated state-of-the-art instrumental changes is to permanently install seismic sources and seismic detectors in one or more boreholes in and around the area of economic interest. Identical processing methods are applied to the data throughout the monitoring period using multiple cross-well (cross-borehole) tomography rather than conventional surface type field seismic operations. One such method is disclosed in U.S. Pat. No. 5,886,255 to Aronstam, filed Oct. 14, 1997 and assigned to the assignee of this invention and which is incorporated herein by reference as a teaching of multiple cross-well tomography.

Another description of wellbores containing permanent downhole formation evaluation systems can be found in U.S. Pat. No. 6,456,566 to Aronstam, filed Jul. 21, 2000 and assigned to the assignee of this invention and all of the contents of which are incorporated herein by reference. The '566 patent teaches the use of minor borehole obstructions as sources of seismic energy.

U.S. Pat. No. 5,406,530, issued Apr. 11, 1995 to Tokuo Yamamoto, teaches a non-destructive method of measuring physical characteristics of sediments to obtain a cross sectional distribution of porosity and permeability values and variations and of shear modulus and shear strength. A pair of boreholes has borehole entries spaced apart from each other at a predetermined distance and a plurality of hydrophones is spaced at predetermined known locations. A pseudo random binary sequence code generator as a source of seismic energy is place in another borehole and activated to transmit pseudo-random wave energy from the source to the hydrophones. Seismic wave characteristics are measured in a multiplicity of paths emanating from the source to the hydrophones using cross-well tomography.

The Yamamoto teaching is primarily directed to use in shallow boreholes for engineering studies. Such holes are less than 100 meters deep, as opposed to oil-field boreholes, which may be two to ten or more kilometers deep. The requirement for an active source to be placed at various levels in the borehole is problematic because the source can damage the hole and interfere with production. Since the seismic equipment must be moved up and down the boreholes, it is impossible to maintain identical recording conditions over an extended time period.

G. W. Winbow in U.S. Pat. No. 4,993,001 issued Feb. 12, 1991, describes a method and apparatus for converting tube waves into downhole body waves for seismic exploration. The equipment comprises a rotary-valve tube wave source for producing swept-frequency tube waves that are injected into tubing or well bore fluid. The tube waves are converted into body waves by an elongate tube wave converter located at a selected position downhole. The tube wave converter comprises an elongate body that substantially fills the well bore or tubing and has a shape that efficiently converts the tube waves to body waves at the selected position downhole. This patent is directed primarily to reverse vertical seismic profiling (RVSP). Winbow acknowledges that it is well known in the art that "nonuniformities in the borehole" cause seismic-wave mode conversions that cause secondary seismic radiation and associated multiples.

Winbow employs a single tube-wave converter to serve as a single source of direct and reflected seismic waves but he must repeatedly reposition the device at spaced-apart intervals down the length of the borehole to get extended vertical coverage as in cross-well tomography. That system thus is difficult to implement for the fixed permanent instrumental installation required for 4-D seismic monitoring operation. A further disadvantage of this scheme is that very high energy tube waves are required, which in turn leads to forming strong background noises as the tube waves enter the borehole and when they impact the end of the borehole.

Another downhole device related to that described in U.S. Pat. No. 4,993,001 is a broadband resonant wave downhole seismic source disclosed by Winbow et al. in U.S. Pat. No. 5,268,537. The device is used to partially or completely block off the borehole and create a fluid-filled borehole cavity. The fluid inside the cavity is oscillated to establish a standing pressure wave which is radiated through the wellbore into the surrounding formation. However, this device functions most effectively at high frequencies (i.e., greater than about 1,500 Hz). It is well known that lower frequencies (less than about 1000 Hz) are preferable for routine reflection seismic and tomographic imaging work.

U.S. Pat. No. 4,671,379, which issued to Kennedy et al. on Jun. 9, 1987 and U.S. Pat. No. 4,834,210, which issued to Kennedy on May 30, 1989, discloses a system in which a pulsed energy source is deployed between two end members. Wellbore fluid occupies the space between the two end members, and the pulsed energy source excites the fluid into oscillation within the borehole space between the two end members. The distance between the two end members is varied as the frequency of the pulsed energy source is varied in order to maintain the system at resonance.

In the Kennedy patents, energy is supplied downhole from the surface through coil tubing connected to a rotary valve located on the device downhole. A column of fluid in the wellbore is excited by the supplied energy to produce a resonant standing wave. This is accomplished by isolating the fluid between two gas bladders to form a column of fluid and exciting the fluid in the column into an oscillating motion with a driver that is in communication with the column of fluid. The fluid is oscillated at the resonant frequency of the column defined by the two gas bladders. During the operation of the invention, it is desirable to sweep the rotary valve through a range of resonant frequencies in order to gain more information about the subsurface of the earth. To perform a frequency sweep and maintain the resonant frequency of the fluid in the column, the length of the column must change for the various frequencies in the sweep. The device accomplishes this task by physically moving the gas bladders during the sweep. In order to maintain the column at ½ wave resonance, the gas bladders are moved during an approximately 45 second sweep through a total distance of about 100 feet. The device must maintain resonance in order to operate effectively.

The source is strong and does not cause borehole damage. The patent states that the device provides a relatively efficient source of energy by operating at the resonant frequency of the column of fluid. However, several problems arise from this approach. First, mechanical movement downhole is necessary because the source must operate at the resonant frequency of the column and cannot vary the resonant frequency without changing the column length. The device must contain relatively complicated downhole equipment in order to vary the length of the column. A system requiring downhole moving parts such as this one is less reliable than desired. Repairs can only be affected by removing the system from the borehole leading to costly down time in operations. A second problem is with the duration of the sweep time of the device. As a sweep is made the length of the column varies. The distance each bladder must travel during a sweep is approximately 50 feet (based on a half wave length of a resonant standing pressure wave). Therefore, the sweep requires an extended time, approximately 45 seconds. It is not possible with this system to produce short sweeps of a few seconds each. Nor is it possible to operate with an impulsive source as the exciter.

The Kennedy et al. patents also describe an alternate embodiment that does not vary the length of the column. In this embodiment, inflatable sleeves surround the conduit between the end elements. These sleeves may be inflated with air causing a change in the apparent compressibility in the borehole fluid. The change in fluid properties changes the resonant frequency of the cavity. However, in this case also, the system can only execute relatively long sweeps and requires downhole moving parts leading to lower field reliability.

There is a need for a system of seismic sources fixed permanently in boreholes that may be used for monitoring time-varying reservoir attributes such as the distribution of the contents of a formation. This system would not interfere with or interrupt production of economic resources. Additionally, there is a need for a system that not only would be used with intentionally generated seismic energy, but could also take advantage of naturally occurring or ambient energy in boreholes, for example fluid flow energy, that may be converted to seismic body waves radiated into earth formations around boreholes.

SUMMARY OF THE INVENTION

In one aspect, the present invention provides an apparatus for generating seismic body waves in a hydrocarbon reservoir within an earth formation. In one embodiment, the apparatus includes a closed-loop borehole source that operates substantially independently of a borehole production string and fluids flowing therein. The borehole source includes a resonant cavity for generating resonant energy, a drive source and a control unit.

The drive source provides pressure pulses to the resonant cavity, which can be of any selected geometric shape, at a selected frequency that induces a resonant response. In one embodiment, the closed-loop drive source includes a fluid reservoir, a pump, an accumulator, and an excitation valve. A bleed line maintains pressure equalization or stabilization by allowing fluid to flow from the resonant cavity to the reservoir. The pump, accumulator and excitation valve cooperate to draw fluid from the reservoir at a first pressure and inject a pressure pulse into the cavity. The pressure pulse can have a predetermined and/or selectable pressure and frequency. In one embodiment, the pump can be a piston pump or an electric solenoid oscillator that converts electrical energy into pressure energy and directs the energy into the accumulator. The excitation valve, which may be a rotary valve, provides controlled pressure pulses at a frequency for driving the resonant cavity. The fluid circulates between the cavity and the drive source in a closed-loop fashion.

The control unit controls the operation of the drive source. In one embodiment, the control unit is linked to the drive source and can issue command signals for adjusting one or more parameters of interest. In one embodiment, the control unit also includes one or more sensor for measuring operating and/or performance parameters of interest. Exemplary parameters of interest include pressure and temperature in the cavity, rotational speed of a rotary valve, fluid flow rate, and pressure waves generated by the cavity. In certain embodiments, the control unit can be replaced with simplified mechanical, electromechanical, or hydraulic linkages and other suitable devices in lieu of electronic circuitry and computer control. In one exemplary mode of operation, the control unit collects and transmits sensor data to the surface and executes commands transmitted from the surface. The control unit can include one or more processors to process or condition the signal prior to transmission. In another mode of operation, the control unit controls the operation of the borehole source in a closed-loop fashion according to pre-programmed instructions in a memory module. The control and data signals can be transmitted by a suitable two-way telemetry system.

In another aspect, the present invention provides a borehole source that utilizes a smart fluid in a closed-loop fluid system as a resonant fluid. A "smart" or "controllable" fluid are materials that respond to an applied excitation field such as an electric or magnetic field with a change in their Theological behavior. In this embodiment, the borehole source includes a resonant cavity for generating resonant energy, a closed loop drive source and a control unit. In one embodiment, the closed-loop drive source includes a fluid reservoir, a pump, an accumulator, an excitation valve and a bleed line. The use of a smart fluid for the circulating fluid extends the operating capability of the borehole source and adds additional measures of control and functionality to the borehole source. In one embodiment, the cavity includes an excitation coil for providing an excitation signal or field that induces a change in a selected material property of the smart fluid within the resonant chamber. In one embodiment, the coil is a magnetic or electrical coil that, when energized, generates an excitation signal that changes a material property of the fluid. The coil can also be configured to provide an excitation field having a variable and selectable strength or magnitude. Further, the coil can be adapted to generate a uniform excitation field or excitation fields of varying size and shape. In one arrangement, the borehole source includes a plurality of resonant tubes, which can be of equal or variable length, that are circumferentially arrayed around one or more wellbore tubulars such as production tubing. Each tube can be independently operable to provide acoustical signals or pulses that have a specified shape, orientation and/or direction. The control unit controls the operation of the drive source and can issue instructions for adjusting one or more parameters of interest. In an exemplary mode of operation, the control unit is programmed to provide a pressure wave at a resonant frequency. The control unit can be programmed to adjust the excitation valve to operate at the desired frequency and/or be operatively coupled to the pump to adjust pressure. The control unit can also be programmed to energize the coil to provide an excitation field at a specified magnitude or strength to control the rheological character of the fluid and/or control the effective length of the resonant chamber. Thus, the control unit and resonant cavity cooperate to produce a selected resonant frequency or a range of frequencies.

Examples of the more important features of the invention have been summarized (albeit rather broadly) in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For detailed understanding of the present invention, reference should be made to the following detailed description of the preferred embodiment, taken in conjunction with the accompanying drawing.

Figure 1A:
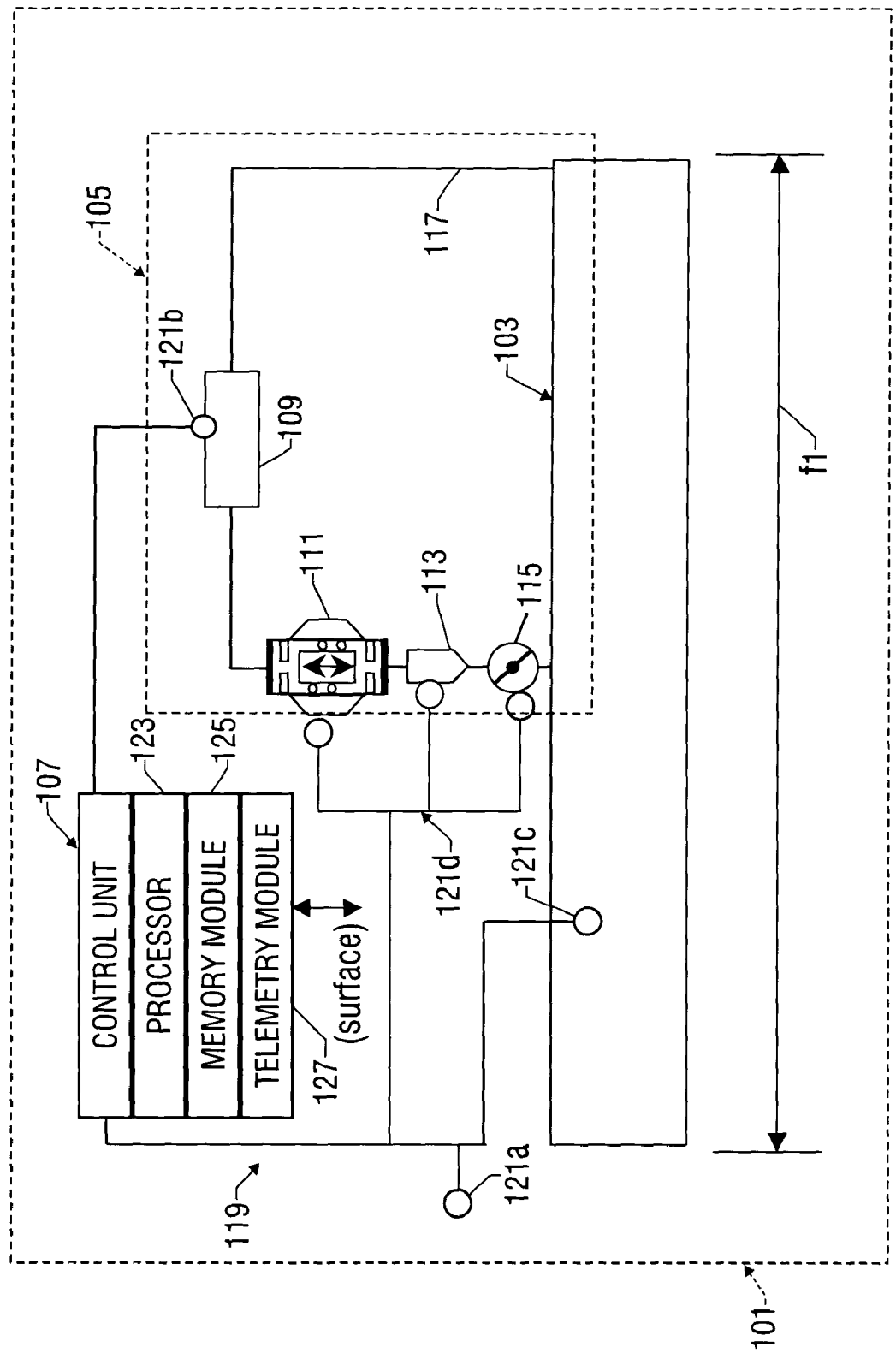
FIG. 1A schematically illustrates a closed-loop acoustic cavity resonator made in accordance with one embodiment of the present invention.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention is a method and system for creating and measuring a seismic wavefield for monitoring the distribution of the contents of a subsurface mineral deposit over its economic life span for long-term resource management. The system employs pressure waves generated within well bore structures. The wellbore structure contains a resonant cavity outside of at least one wellbore tubular. The resonant cavity receives pressure energy from a drive source and thereby develop seismic waves in a resonant cavity that is designed to impart these waves into a surrounding formation. The pressure waves in the resonant cavity are coupled to the wellbore structure and are converted to seismic body waves in the adjacent earth formation and radiate away from the well. These seismic body waves detected by sensors may be processed to indicate parameters of interest in the subsurface earth formation.

Time varying changes of selected attributes of those seismic waves that have transited the formations between boreholes or between boreholes and seismic sensors, may be indicative of the temporal changes in the reservoir mineral content. Variations will be readily apparent to persons skilled in the art based on the following detailed description. To the extent that the following detailed description is specific to a particular embodiment or a particular use of the invention, this is intended to be illustrative and is not to be construed as limiting the scope of the invention.

As is well known in the art, wellbore production systems are comprised of tubulars. Wellbore systems generally include a well casing in the earth that separates the well apparatus and production equipment from the earth formation along the well path. Casing is not always present, for example at the bottom of some wells. Other tubulars may be inside the well casing and sometimes extending below the casing, including one or more production tubing strings. Other tubulars may transport fluids, chemicals and provide communication and energy conduits between the surface and downhole locations. The resonant cavity of the present invention is outside of at least one of the wellbore tubular structures.

In one aspect, this invention provides seismic sources in a well bore for the purpose of in-situ imaging. Prior art bore hole seismic sources are for transient use in the borehole and require intervention in, and disruption of, the production stream. In one aspect, the present invention is for a permanently installed seismic source mounted externally to the production tubing, which uses little power compared to its radiated strength. In another aspect, the present invention includes a mobile seismic source that is used in a transient mode through a wellbore (e.g., deployed via an umbilical such as a wireline, coiled tubing or slickline). Sources of these types can be used to implement a field wide in-situ imaging array.

Body waves radiating from each resonant cavity location will produce a unique source signature. Source signatures are related to the source behavior dynamics and the resonances created. These source signatures may be measured directly by a transducer near the resonant cavity, or measured by transducers at some distance away from resonant cavity. Additionally, the source signature of the body waves may be derived from known parameters for each well in combination with tube waves measured along the production string.

For the purpose of clarity and explanation, a method according to one aspect of this invention will be described by way of example, but not by way of limitation, with respect to cross-well tomography with receivers in boreholes as well as the earth surface. It is to be clearly understood that the method may be applied to any multichannel data recording geometry or acquisition regime whether seismic sensors are in the subsurface, in well bores, or at or near the surface of the earth. Furthermore, the sources can be stationary in a wellbore or transient (i.e., moved along the wellbore).

Each resonant cavity can be an energy radiation source point with a unique waveform for acoustic energy radiated into the adjacent earth formation. A sensor is placed to record the waveform as it is generated. Each coda is then deconvolved, for example using cross correlation, with the seismic wave field recorded away from the well bore, for instance with seismic sensors in another well bore or on the surface of the earth or the ocean floor.

The source signature (or coda) associated with a particular resonant cavity will be the seismic signature for that seismic energy source point. However, as disclosed in U.S. Pat. No. 6,456,566 to Aronstam, minor well bore obstructions radiate body waves, (both pressure waves and shear waves (P-waves and S-waves)) from wellbores. The method and system of the '566 patent may be combined with the resonant cavity method and system of the present invention so that coda recorded by seismic sensors include signal contributions from resonant cavity radiation as well as minor borehole obstructions.

The term "signature" as used herein, means the variations in amplitude, frequency and phase of an seismic waveform (for example, a Ricker wavelet) expressed in the time domain as displayed on a time scale recording. As used herein the term "coda" means the seismic body wave seismic-energy imparted to the adjacent earth formation at a particular location. The coda associated with a particular seismic energy source point, resonant cavity, or minor well bore obstruction will be the seismic signature for that seismic energy source point. The term "resonant cavity" includes any shape or character of a fluid filled chamber from which seismic energy emanates. The resonant cavity may contain more than one fluid. The term "impulse response" means the response of the instrumentation (seismic sensors and signal processing equipment) to a spike-like Dirac function or impulse. The signal energy of an acoustic wavefield received by seismic sensors depends upon the texture of the rock layers through which the wavefield propagated, from which it was reflected or with which it is otherwise associated, whether along vertical or along lateral trajectories. The term "texture" includes petrophysical parameters such as rock type, composition, porosity, permeability, density, fluid content, fluid type and inter-granular cementation by way of example but not by way of limitation.

In one embodiment a receiver is placed near a resonant cavity to record source signature associated with the resonant cavity. However, there are other methods of determining or measuring signatures, and receivers are not required to directly measure the source signature for every seismic source. A transducer may be lowered in the annular space and a pilot signal directly recorded. For example, a lightweight fiber optic transducer may be used to record data while having a negligent effect on transited seismic energy.

Alternatively, beam steering of recordings of receiver arrays (which can be on the earth's surface or any other location) may be used to determine the location and signature of seismic source resonators along the well bore. Beam steering is a method of emphasizing energy from a particular direction and location by delaying successive channels so that events of a certain dip moveout (or apparent velocity) occur at the same time, and then summing them. Beam steering involves time-shifting the results from single sources by amounts that are proportional to the distances between the sources and adding the results to direct the beam. The beam directivity may be changed by varying the time shifts. This procedure can be repeated for a succession of different seismic source locations.

Complex and arbitrary shapes for the resonant cavity may be designed to increase the variability of the source signature as well as to change the effective bandwidth and frequency characteristics of the radiated signal. In certain embodiments, the cavity surrounds a wellbore tubular structure. The present invention provides the resonant cavity can be asymmetrical and arbitrary in shape. The resonant cavity can be designed for emanating a broad range of frequencies into the formation adjacent the well.

Referring now to FIG. 1A, there is schematically illustrated a closed-loop borehole source 101 that operates substantially independently of a borehole production string (not shown) and fluids flowing therein. The bore hole source 101 can utilize a hydraulic fluid, liquid or other suitable fluid. The borehole source 101 includes a resonant cavity 103 for generating resonant energy, a closed loop drive source 105 and a control unit 107. The drive source 105 provides pressure pulses to the resonant cavity 103 at a selected frequency that induces a resonant response and the control unit 107 provides intelligent control of the drive source 105. The fluid circulates between the cavity 103 and the drive source 105 in a closed-loop fashion.

The resonant cavity 103 is used to create and develop resonant energy. Any completely enclosed conductive surface, regardless of its shape, can act as a cavity resonator. A resonant cavity 103 is a cavity in which standing waves can be built up. These standing waves have frequencies that depend, in part, upon the cavity length. In general, the smaller the cavity, the higher its resonant frequency. Another factor is the shape of the cavity. Changing the frequencies of a cavity is known as tuning. These resonant cavity sources are capable of producing both P and S wave energy. In the FIG. 1A embodiment, the resonant cavity 103 is formed as a cylinder having a length f1 that produces a fixed resonant frequency.

In certain embodiments, different geometrical shapes for the resonant cavity are used to produce a selected frequency response.

Figure 1B:
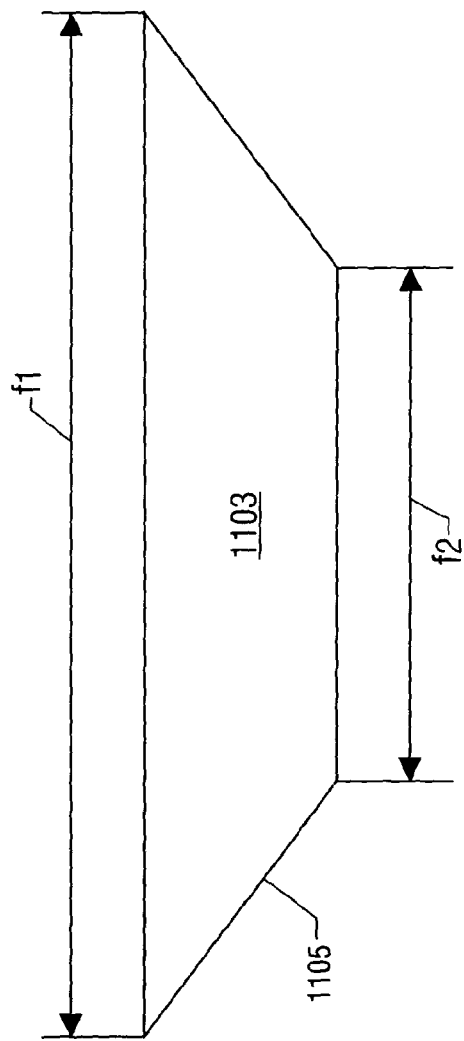
FIG. 1B schematically illustrates an exemplary chamber having a specified range of frequencies for a closed-loop acoustic cavity resonator made in accordance with one embodiment of the present invention.

In the FIG. 1B embodiment, the resonant cavity 1103 is provided with a trapezoidal type shape that has first length f1 along one section 1103a of the resonant chamber 1103 and a second length f2 along another section 1103b of the resonant chamber 1103. Resonant cavities substantially similar to 1103 can be designed and operated to create the strongest resonant frequencies between a relatively low frequency determined by the length f1 and a higher frequency as defined by the second length f2. The slope 1105 between the lengths f1 and f2 can be varied to provide a defined transition between the relatively high and low frequencies.

Figure 1C:
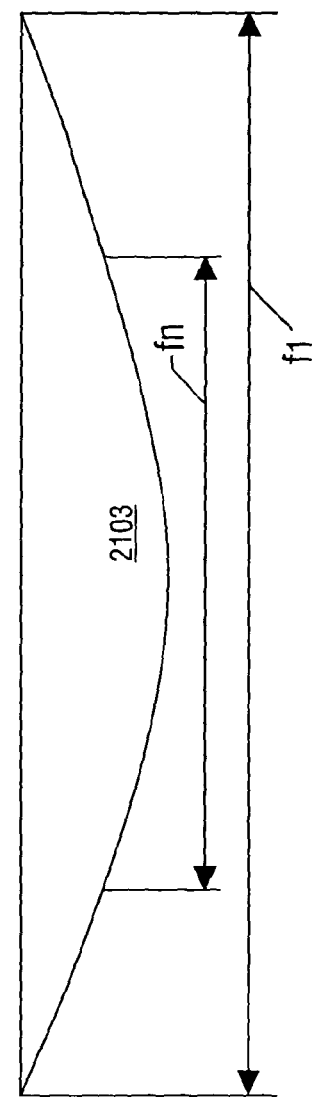
FIG. 1C schematically illustrates an exemplary chamber having a substantially continuous range of frequencies for closed-loop acoustic cavity resonator made in accordance with one embodiment of the present invention.

In the FIG. 1C embodiment, the resonant cavity 2103 is provided with a ellipsoid type shape that has one length f1 along one section 2103a of the resonant chamber 2103 and a continuously variable length fn along another section 2103b of the resonant chamber 2103. Resonant cavities substantially similar to 2103 can be designed and operated to create the strongest resonant frequencies between a relatively low frequency determined by the length f1, and a continuous spectrum of higher frequencies as defined by the variable length fn.

Referring back to FIG. 1A, in one embodiment, the closed-loop drive source 105 includes a fluid reservoir 109, a pump 111, an accumulator 113, and an excitation valve 115. A bleed line 117 maintains pressure equalization or stabilization by allowing fluid to flow from the resonant cavity 103 to the reservoir 109. The bleed line 117 includes suitable valves/ports, such as one-way check valves, that permit fluid in the cavity 103 to flow into the fluid reservoir 109, which is at a lower pressure than the fluid in the cavity 103. The bleed line 117 is positioned at one or both distal ends of the cavity 103. Flow through the bleed line 117 can be controlled relative to a predetermined parameter, such as pressure, temperature or flow rate. In one embodiment, the bleed line 117 can allow pressure within the cavity 103 to equalize and to compensate for changes in temperature. The bleed line 117 can be used for pressure and/or temperature equalization. For instance, the seismic source pressure energy within the resonant cavity may be developed around some mean value, or the pressure fluctuations may appear to be added or subtracted from some constant or background pressure within the cavity.

The pump 111, accumulator 113 and excitation valve 115 cooperate to draw fluid from the reservoir 109 at a first pressure P0 and inject a pressure pulse having a second pressure P1 at a specified frequency into the cavity 103. In one embodiment, the fluid is injected into one or more centralized locations into the cavity 103. In one embodiment, the pump 111 can be a piston pump or an electric solenoid oscillator that converts electrical energy from a local source such as a battery (not shown) or the surface into pressure energy and directs the energy into the accumulator 113; i.e., the pump 111 draws fluid from the reservoir 109, which is at pressure P0, and increases the pressure to P1. The accumulator 113 receives fluid at a pressure P1 from the pump 111. The accumulator 113 functions as a supply tank for the fluid at pressure P1. At a selected and controllable frequency, the valve 115 opens to periodically inject fluid at pressure P1 from the accumulator 113 into the chamber 103. In a separate embodiment, an electric solenoid may be used instead of the valve. Thus, for instance, the pump 111 can provide fluid at a pressure Pi, which is intermediate P0 and P1, and the electric solenoid can step the pressure to P1 from Pi during the controlled injection into the chamber 103.

The excitation valve 115 (e.g., rotary valve or electric solenoid oscillator or piston pump, etc.) provides controlled injection of pressure pulses at a frequency for driving the resonant cavity 103. A resonant cavity is excited to resonance by injecting pressure pulses at a frequency to match the length or other geometric attributes of the cavity, and thereby creating resonances that radiate from the cavity into the earth formation surrounding the well. The excitation valve 115 or the electric solenoid activation speed should match the frequency of the resonant chamber.

The control unit 107 controls the operation of the drive source 105. In one embodiment, the control unit 107 is linked to the drive source 105 via suitable wires or conductors 119 for transmitting data and control signals and can issue instructions for adjusting one or more parameters of interest. For instance, the control unit 107 can adjust the operating frequency of the valve 115, the output pressure of the pump 111, the flow through the bleed line 117 and other operating characteristics. The control unit 107 also includes one or more sensors for measuring operating and/or performance parameters of interest. For example, pressure and temperature sensors in the cavity 103 can provide the control unit 107 with data regarding the status or condition of the fluid in the cavity 103. Other sensors can be positioned through out the drive source 105 to measure operating parameters such as pressure, temperature, rotational speed of a rotary valve, stroke rate of a piston pump, flow rate and other parameters of interest. Still other sensors, such as a geophone or hydrophone (not shown), can be used to assess the nature and quality of the output signal (e.g., direction and amplitude) of the pressure wave generated by the cavity 103. Merely by way of illustration, sensor 121*a* measures the seismic energy output of the cavity 103, sensor 121*b* measures the pressure and flow rate of the fluid in the reservoir 109, sensor 121*c* measures the pressure and temperature of the fluid in the cavity 103, and sensor 121*d* measures the operating parameters of the drive source 105 (e.g., operating frequency, flow rate, pressure, rate of reciprocation, rate of rotation, etc.). These sensors can be proximate the cavity 103. Sensors providing measurements (e.g., geophones) used assess and modify the source 101 output (e.g., in a feed-back arrangement) can be located proximate the cavity 103, at the surface, or in an offset well (not shown). While the control unit 107 has been described as positioned proximate to the borehole source 101, the control unit can be positioned remote from the borehole source 101 such as at a different depth from the borehole source 101 or at the surface. In other embodiments, the control unit 107 can be replaced with simplified mechanical, electromechanical, or hydraulic linkages and other suitable devices in lieu of electronic circuitry and computer control.

In one exemplary mode of operation, the control unit 107 collects and transmits the sensor data to the surface and executes commands transmitted from the surface. The control unit 107 can include one or more processors 123 to process or condition the signal (e.g., digitizers to digitize the data and filters to "clean" the data) prior to transmission. In another mode of operation, the control unit 107 controls the operation of the borehole source in a closed-loop fashion according to pre-programmed instructions in a memory module 125. The control unit 107 can, for example, issue control signals to the components of the drive source 105 based on measurements of one or more parameters of interest. In another mode of operation, the memory module 125 can include instructions that initiate a full frequency sweep at selected intervals. For instance, to develop a time-based study (or "4-D" data acquisition), the control unit 107 can trigger a full frequency sweep on a monthly basis. The recorded data, therefore, will characterize the dynamic behavior of the reservoir over a period of time and enable more efficient well management. The control and data signals can be transmitted by a suitable two-way telemetry system 127 utilizing electromagnetic (EM) signals, radio frequency (RF) signals, fiber optics, electrical conductors, acoustical signals, etc.

Figure 2A:
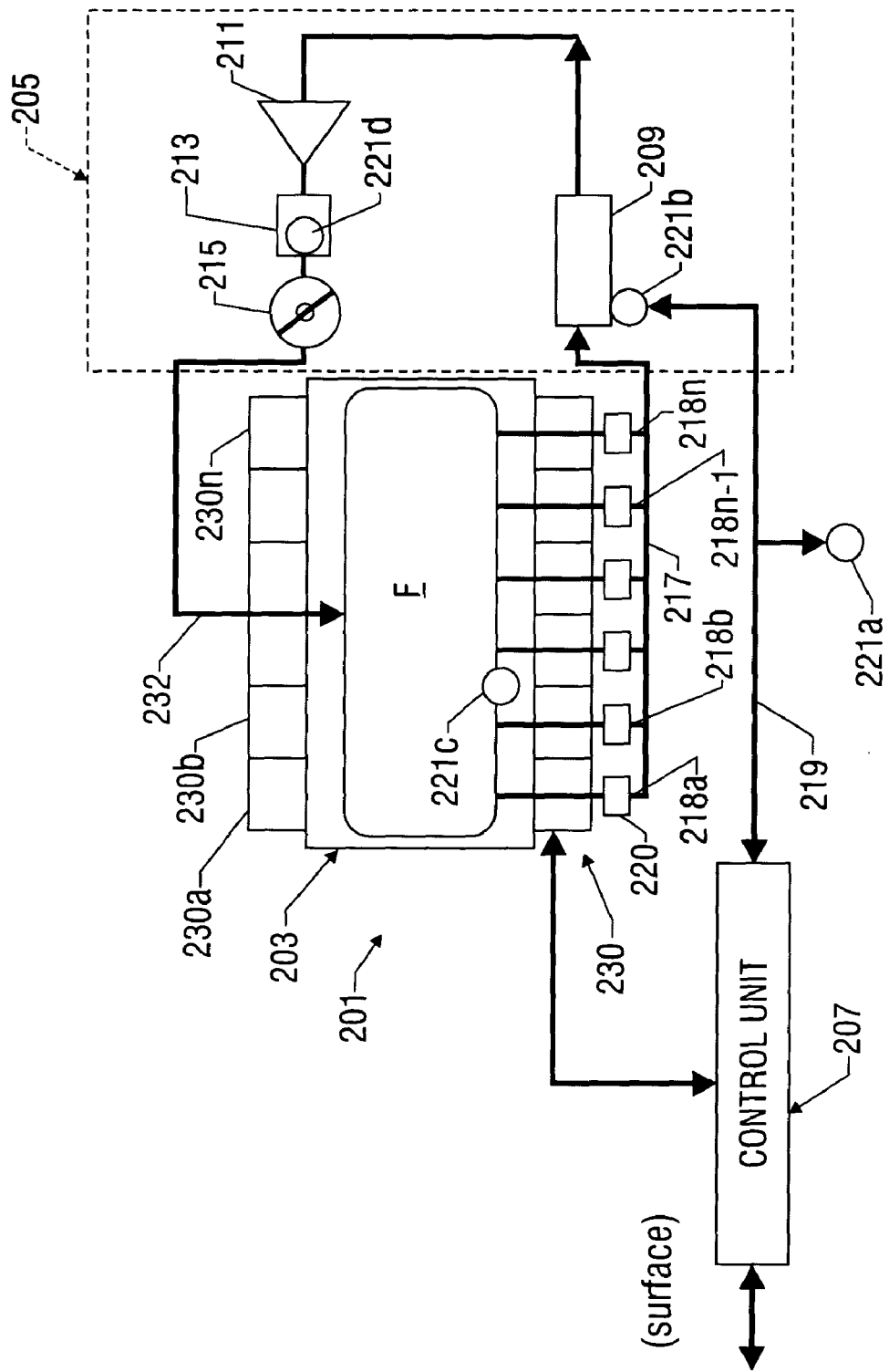
FIG. 2A schematically illustrates a closed-loop acoustic cavity resonator that uses a smart fluid as the circulating fluid and is made in accordance with one embodiment of the present invention.

Referring now to FIG. 2A, there is schematically illustrated an embodiment wherein a smart fluid is advantageously utilized in the context of the present invention. The FIG. 2A embodiment also is a closed-loop borehole source 201 that operates substantially independently of a borehole production string (not shown) and fluids flowing therein. The borehole source 201 includes a resonant cavity 203 for generating resonant energy, a closed loop drive source 205 and a control unit 207. The drive source 205 provides pressure pulses to the resonant cavity 203 at a selected frequency that induces a resonant response. In one embodiment, the closed-loop drive source 205 includes a fluid reservoir 209, a pump 211, an accumulator 213, and a rotary valve 215. A bleed line 217 maintains pressure equalization or stabilization by allowing fluid to flow from the resonant cavity 203 to the reservoir 209. A plurality of vent lines 218*a*-*n* are provided in a spaced-apart relation along the cavity 203. Each of the vent lines 218*a*-*n* selectively discharges fluid into the bleed line 217 in a manner described below. The vent lines 218*a*-*n* include one or more flow control devices (e.g., valve) for selectively controlling the flow through the lines 218*a*-*n*. An exemplary flow control device, such as a valve, is labeled with numeral 220. Other features are generally similar to those described with reference to FIG. 1A and will not be repeated for brevity.

As will be described below, the use of a smart fluid F for the circulating fluid extends the operating capability of the borehole source 201. A "smart" or "controllable" fluid or material is one that responds to an applied excitation field such as an electric or magnetic field with a change in its rheological behavior. Typically, this change is manifested when the fluids are gelled (resistive to shear) more or less proportional to the magnitude of the applied field. These materials are commonly referred to as electrorheological (ER) or magnetorheological (MR) fluids. Smart fluids provide simple, quiet, rapid-response interfaces between electronic controls and mechanical systems.

MR fluids are typically non-colloidal suspensions of polarizable particles having a size on the order of a few microns. Typical carrier fluids for magnetically responsive particles include hydrocarbon oil, silicon oil and water. The particulates in the carrier fluid may represent 25-45% of the total mixture volume. Such fluids respond to an applied magnetic field with a change in Theological behavior. Polarization induced in the suspended particles by application of an external field causes the particles to form columnar structures parallel to the applied field. These chain-like structures restrict the motion of the fluid, thereby increasing the viscous characteristics of the suspension. Thus, in one aspect, a smart fluid F is one whose flow properties (e.g., shear strength) can be changed through application of a low-power control or excitation signal. Other materials that respond in a predictable manner (e.g., change in size, viscosity, etc.) upon receiving an excitation signal (e.g., electrical, magnetic, thermal, etc.) may also be used.

An exemplary cavity 203 includes an excitation coil 230 for providing an excitation signal that induces a change in a selected material property of the fluid F. The coil 230 is a magnetic or electrical coil that, when energized, generates an excitation signal (e.g., magnetic or electrical field) that changes a material property (e.g., increases or decreases viscosity, shear strength, etc.) of the fluid F. In one embodiment, the coil 230 is configured to generate an excitation field having a specified strength or magnitude (e.g., amperes). Such a coil can be operated in a step-function type fashion (i.e., off-on). The coil 230 can also be configured to provide a excitation filed having a variable and selectable strength or magnitude. Further, the coil can be adapted to generate one uniform excitation field (e.g., one coil) or excitation fields of varying size and shape. For instance, a plurality of segmented coils 230a-n that can be independently energized can be used to produce one or more excitation fields having a selected geometry.

Figure 2B:
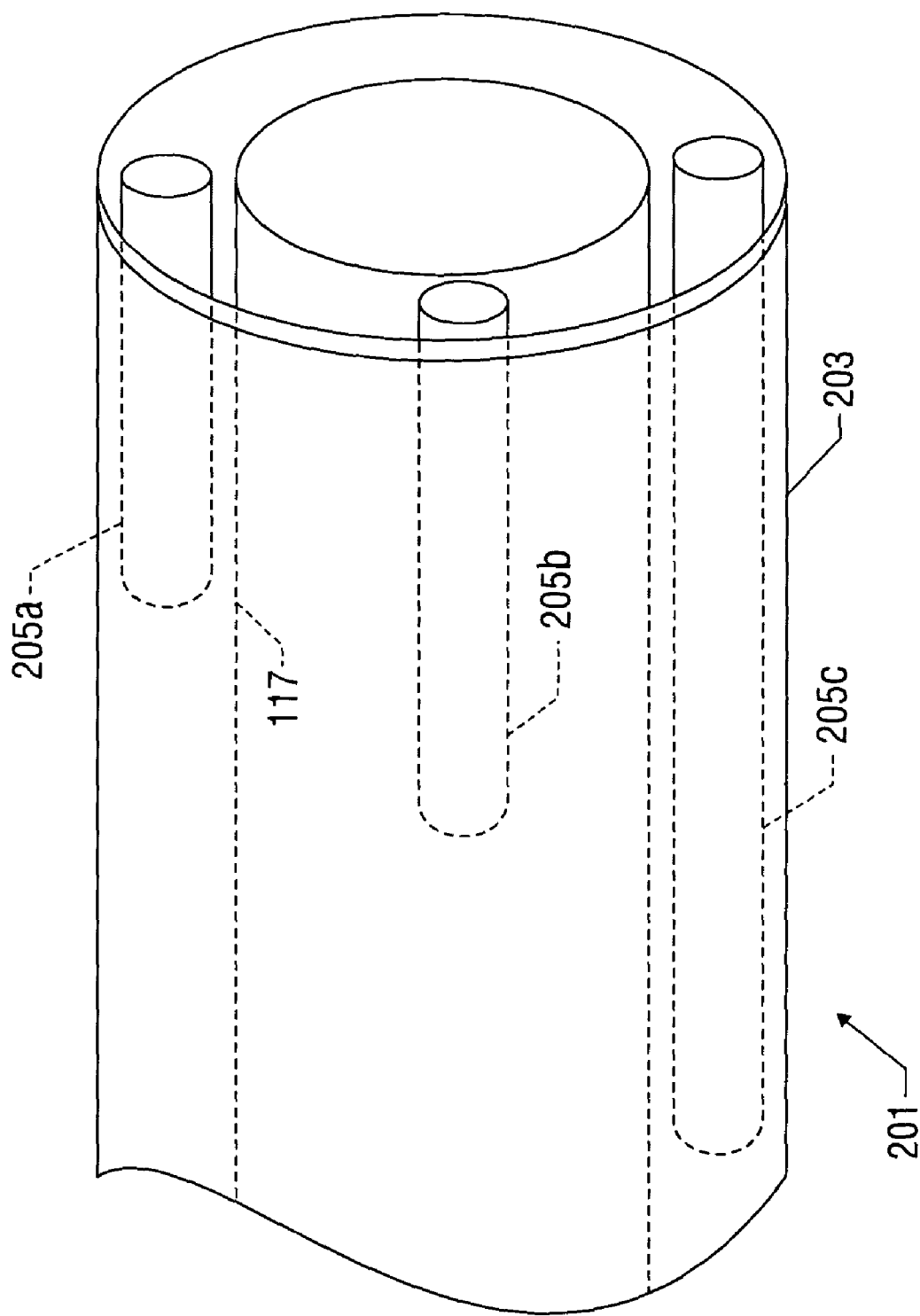
FIG. 2B schematically illustrates an exemplary chamber made in accordance with one embodiment of the present invention.

Referring briefly to FIG. 2B, there is shown an embodiment of borehole source 201 having a housing 203 utilizing a plurality of resonant tubes 205a-n. The resonant tubes 205a-n are circumferentially arrayed around a wellbore tubular such as production tubing 117. Each tube 205a-n includes an elongated chamber that is axially aligned with the production tubing 117. In one embodiment, the tubes 205a-n have substantially equal lengths. In another embodiment, the tubes 205a-n each have a different length and, therefore, provide a different range of frequencies. For example, tube 205a has a first length configured to produce a frequency range of $f_1$-$f_2$, tube 205b has a second length configured to produce a frequency range of $f_2$-$f_3$, and tube 205c has a third length configured to produce a frequency range of $f_3$-$f_4$. Each of the tubes 205a-n are independently operable; e.g., each tube 205a-n has an associated excitation coil (not shown) and is separately coupled to an drive source (not shown). It will be appreciated that a number of operating modes can be utilized with one or more of these embodiments. For example, all of the tubes 205a-n can be energized simultaneously to provide a radially symmetric pulse. Also, fewer than all of the tubes (e.g., tubes 205a and 205b) can be energized to produce a radially asymmetric pulse (e.g., a pulse aimed in a specified azimuthal direction). In certain embodiments, the directional pulse can be formed by selectively acoustically uncoupling a portion of a source tube from the surrounding wellbore structure or operating an adjacent tube in a manner that cancels a selected portion of the pulse radiating from the source tube. Moreover, the amplitude of the waves produced by the individual tubes 205a-n can also be controlled; i.e., increased or decreased. In still another mode, the sources may be deployed in a plurality of wellbores in an oil field. The sources of each wellbore can be configured to emit a signal at a unique selected frequency. Thus, advantageously, the recorded signals can be readily associated with the emitting source and wellbore. In a related mode, the sources can be deployed in a single wellbore at a number of selected depths. Each of these sources can be configured to emit signal at a unique specified frequency to, again, provide a convenient method of determining the location of the source producing the signal. Thus, it can be seen that the tubes 205a-n can be configured to provide signals or pulses that are selectively shaped and/or oriented.

Referring back to FIG. 2A, the control unit 207 controls the operation of the drive source 205. In one embodiment, the control unit 207 is linked to the drive source 205 via suitable wires or conductors 219 for transmitting data and control signals and can issue instructions for adjusting one or more parameters of interest. In addition to the functions and operations previously discussed with reference to FIG. 1A, the control unit 207 controls the excitation signals produced by the coil 230. In one advantageous arrangement, the control unit 207 adjusts the shear strength of the smart fluid F to vary, adjust, maintain or otherwise control the frequency of the resonant cavity. The control unit 207 is also operatively coupled to the driver source 205 and a plurality of sensors 221 that measure one or parameters of interest previously discussed with reference to FIG. 1A. Merely by way of illustration, sensor 221a measures the seismic energy output of the cavity 203, sensor 221b measures the pressure and flow rate of the fluid in the reservoir 209, sensor 221c measures the pressure and temperature of the fluid in the cavity 203, and sensor 221d measures the operating parameters of the drive source (e.g., operating frequency, flow rate, pressure, rate of reciprocation, rate of rotation, etc.).

In an exemplary mode of operation, the control unit 207 is programmed to provide a pressure wave at a resonant frequency f. As is known, one method of modeling a resonant frequency of the cavity 203 is defining v/l as proportional to f, where v is the velocity of sound in the fluid F, and l is the length of the column of fluid F. The control unit 207 adjusts the excitation valve 215 to operate at the desired frequency f. This may, for example, involve adjusting the rotational speed of a rotary valve or the stroke speed of a reciprocating solenoid valve. The control unit 207 also energizes the coil 230 to provide an excitation field at a magnitude or strength at which fluid F has a value of fluid velocity v that causes the resonant cavity 203 to resonate at frequency f. The control unit 207 can also be operatively coupled to the pump 211 to adjust P1. Rather than preprogrammed values for f and P1, these values can be transmitted from the surface as command signals.

Figure 3:
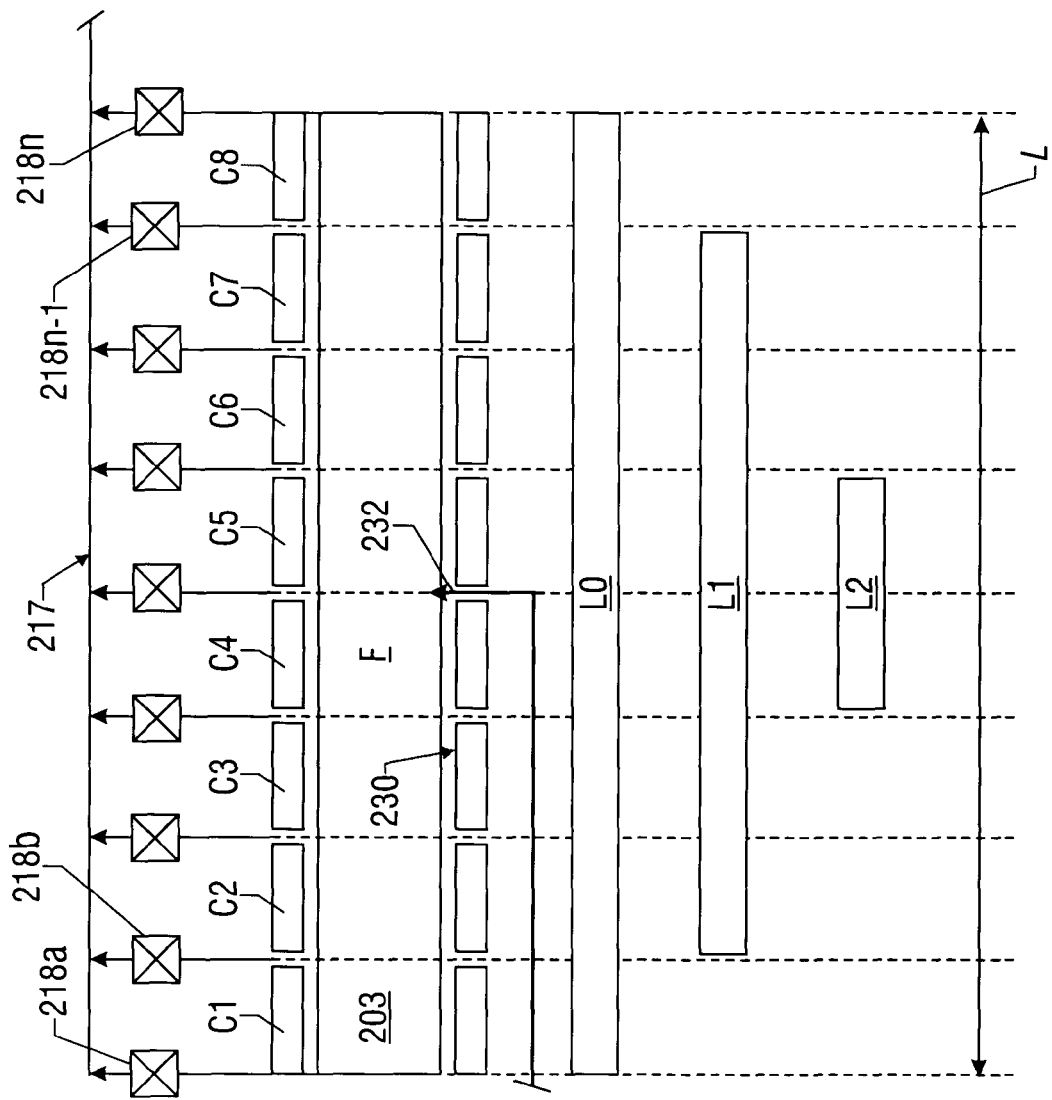
FIG. 3 graphically illustrates exemplary operation of a closed-loop acoustic cavity resonator that uses a smart fluid as the circulating fluid and is made in accordance with one embodiment of the present invention.

Referring now to FIG. 3, there is graphically illustrated how the control circuit 207 (FIG. 2A) and resonant cavity 203 cooperate to produce a selected resonant frequency or a range of frequencies. Schematically illustrated is a resonant tube or cavity 203 filled with a smart fluid F that is surrounded by an excitation coil 230 having a plurality of segments C1-C8. Each coil segment C1-C8 can be energized independently or in selected groups to produce a localized excitation field. A central Injection point 232 in fluid communication with the excitation valve 215 (FIG. 2A) for the smart fluid F is positioned in the cavity 203. While a single injection point 232 is shown, multiple spaced-apart injection points may be used. Valve controlled vent lines 218a-n are positioned in spaced-apart relation along the cavity 203 to allow fluid to selectively flow into the pressure equalization line 217 (FIG. 2). The vent lines 218a-n open and close in conjunction with the energizing of the segmented coils 230a-n. As explained below, the selective energizing of the coils 230a-n changes the effective length of the fluid F in the chamber 203. The fluid F discharges from the "end" of the effective length. Thus, for example, when the fluid length is at its effective maximum, then lines 218a and 218n are opened. As the fluid length decreases, the associated interior lines (e.g., 218b and 218n-1) are opened. A single bleed line may also be used in certain embodiments. Merely for convenience, the following discussion assumes that the coils 230 produce a magnetic field and the shear strength of the fluid F varies directly with the strength of the magnetic field.

Referring now to FIGS. 2 and 3, in one mode of operation, individual coil segments C1-C8 are independently energized to form a fluid F length of a selected length and/or geometry. For example, segments C1 and C8 can be simultaneously energized. When subjected to the resulting excitation field, the fluid F within the effective range of the segments C1 and C8 can go to a highly viscous, semi-solid or solid state. Thus, the remaining fluid F has a length L1, which is smaller than the length L of the coil C. Concurrently, vent lines 218b and 218n-1 are opened to allow fluid discharge at the ends of this effective length L1. Because v/l is proportional to f, the reduction in length will increase the resonant frequency. In another example, segments C1-3 and C6-8 are simultaneously energized and the appropriate vent lines 218a-n are opened. The resulting column of fluid F has a smaller length L2, which is smaller than L.

As noted earlier, one method of modeling a resonant frequency of the cavity 207 is by defining v/l as proportional to If. Thus, in another mode of operation, the coil 230 is energized to produce a magnetic field of adjustable strength or magnitude. When subjected to this magnetic field, the shear strength of the fluid F increases. Because the velocity of sound varies directly with shear strength, the resonant frequency (f) also increases. Thus, it can be seen that by adjusting the strength of the magnetic field (i.e., excitation field), the resonant frequency of the cavity can be adjusted or tuned.

One skilled in the art will recognize that the above-described modes either separately or combined can provide a borehole seismic source that can produce a range of resonant frequencies having high resolution.

Referring now to FIG. 2A, in certain embodiments, a smart fluid can also be used to operate excitation valve or valve(s) leading to or from the cavity 203 or other flow control devices in the fluid path through the drive source 205. For instance, the flow control device 220 can include valves having magnet windings selectively positioned around non-magnetic fluid circulation lines. When a winding is energized, the controllable fluid within the associated conduit congeals in the proximity of the winding to block fluid flow within the conduit. Thus, for example, by selectively energizing any one or more of the windings associated with the flow control device 220, the fluid flow through one or more bleed lines 218a-n or other conduits may be selectively elected or blocked. This arrangement may, for example, be used in lieu of the rotary valve 215 by cycling the energization of windings according to a selected frequency. Other valves arrangements utilizing electroactives fluids or smart materials may also be used, such as chamber/cavity vent valves.

Figure 4:
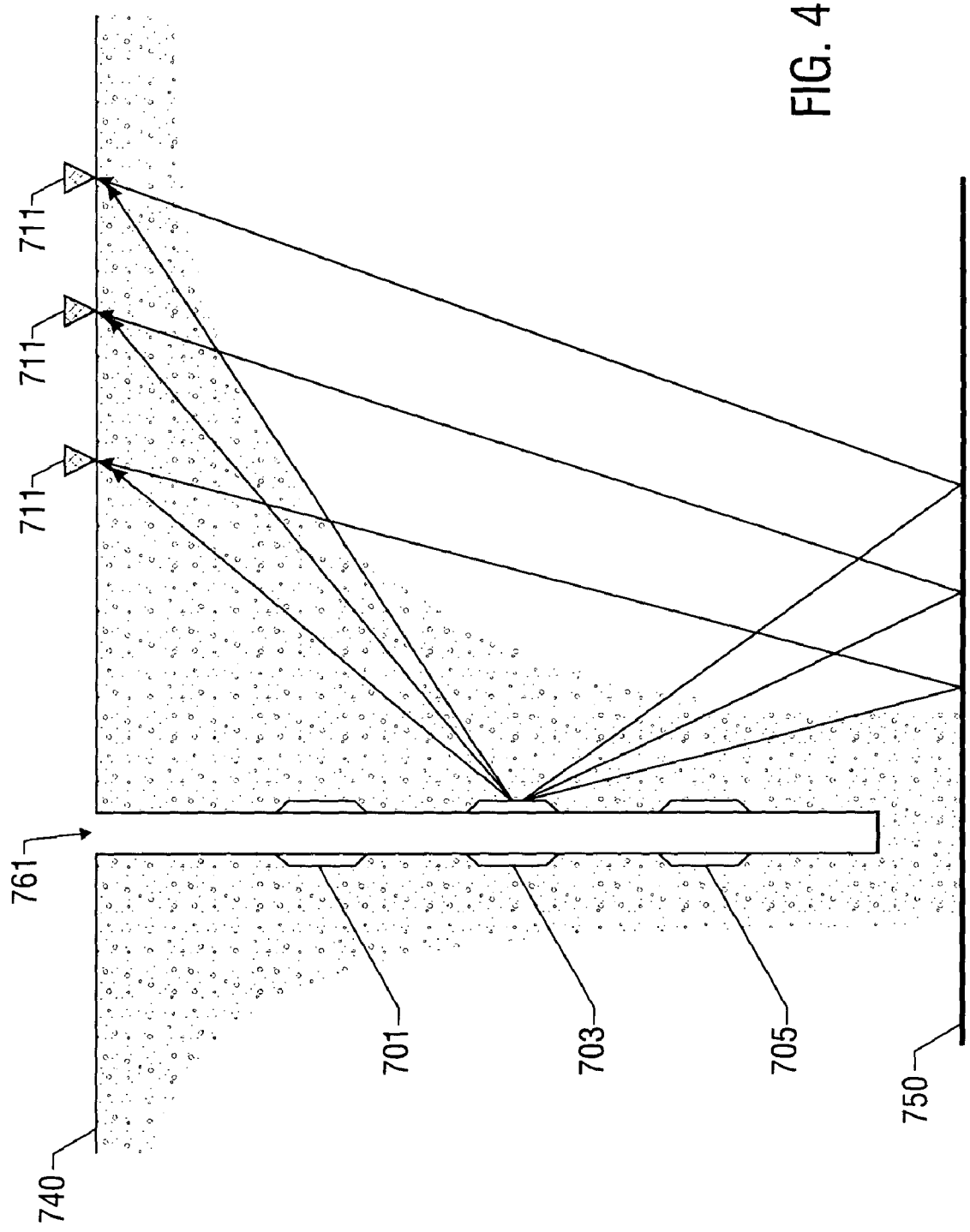
FIG. 4 is a schematic of a Reverse VSP type project utilizing one embodiment of the present invention.

The invention may be used with a reverse VSP type project as shown schematically in FIG. 4. A well 761 has resonant cavities (or chambers) 701, 703 and 705 from which body waves may radiate into the surrounding earth formation. As shown by lines originating at resonant cavity 703, body wave energy may travel directly to earth surface 740 where sensors 711 receive the energy. Body wave energy originating at, for instance, resonator 703 may reflect or refract off of geologic interfaces 750 in the earth. While one geologic interface has been shown, it will be appreciated the earth contains a great number of geological surfaces responsive to seismic energy. Body wave energy may emanate from any of the resonators, 701, 703 or 705, which also may have associated sensors to directly measure the associated source signature, waveform or seismic energy received from any other source point. Methods are known in the art for separating signals from these various sources. Further, as noted earlier, because the resonators can be configured to transmit signals having unique selected signatures (e.g., selected frequencies, amplitudes, shapes, and direction), their location can be readily determined.

Figure 5:
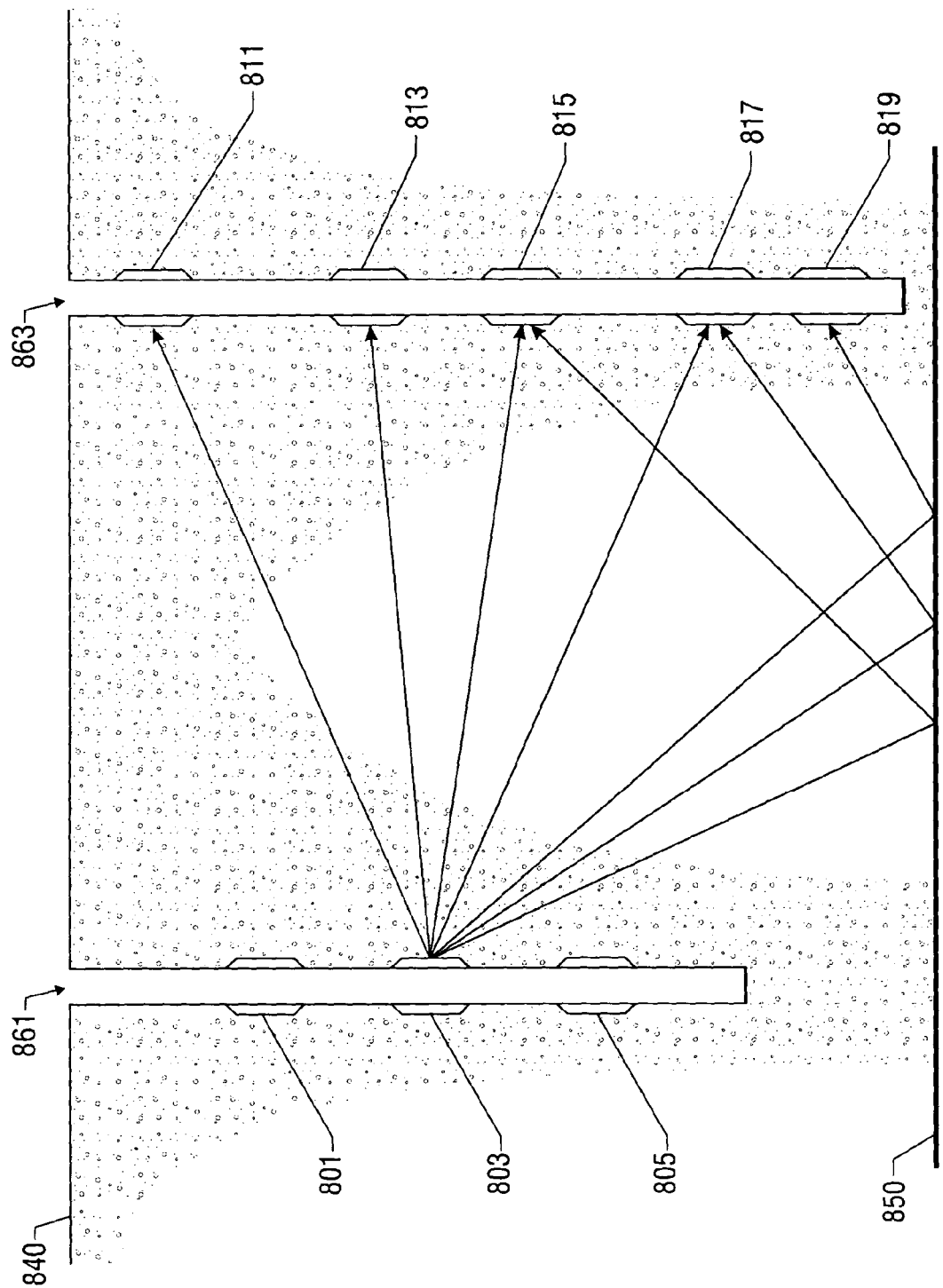
FIG. 5 is a schematic of a Cross-Well application type project utilizing one embodiment of the invention.

Cross-well type tomography may be undertaken as shown in FIG. 5. A source well 861 can contain resonant sources 801, 803, and 805. A cross-well project will have at least one receiver well 863 containing receivers 811, 813, 815, 817, and 819. The lines originating at resonant chamber 803 show a few possible wave paths. The body wave energy may travel directly to receivers 811, 813, 815 and 817 in another well 863. The body wave energy may reflect or refract off of geologic interfaces 850 in the subsurface before being received by receivers 815, 817 and 819. As is well understood in the art, many other body wave paths traversing intervening earth formations containing useful information will be received at sensors in a cross-well type project.

Figure 6:
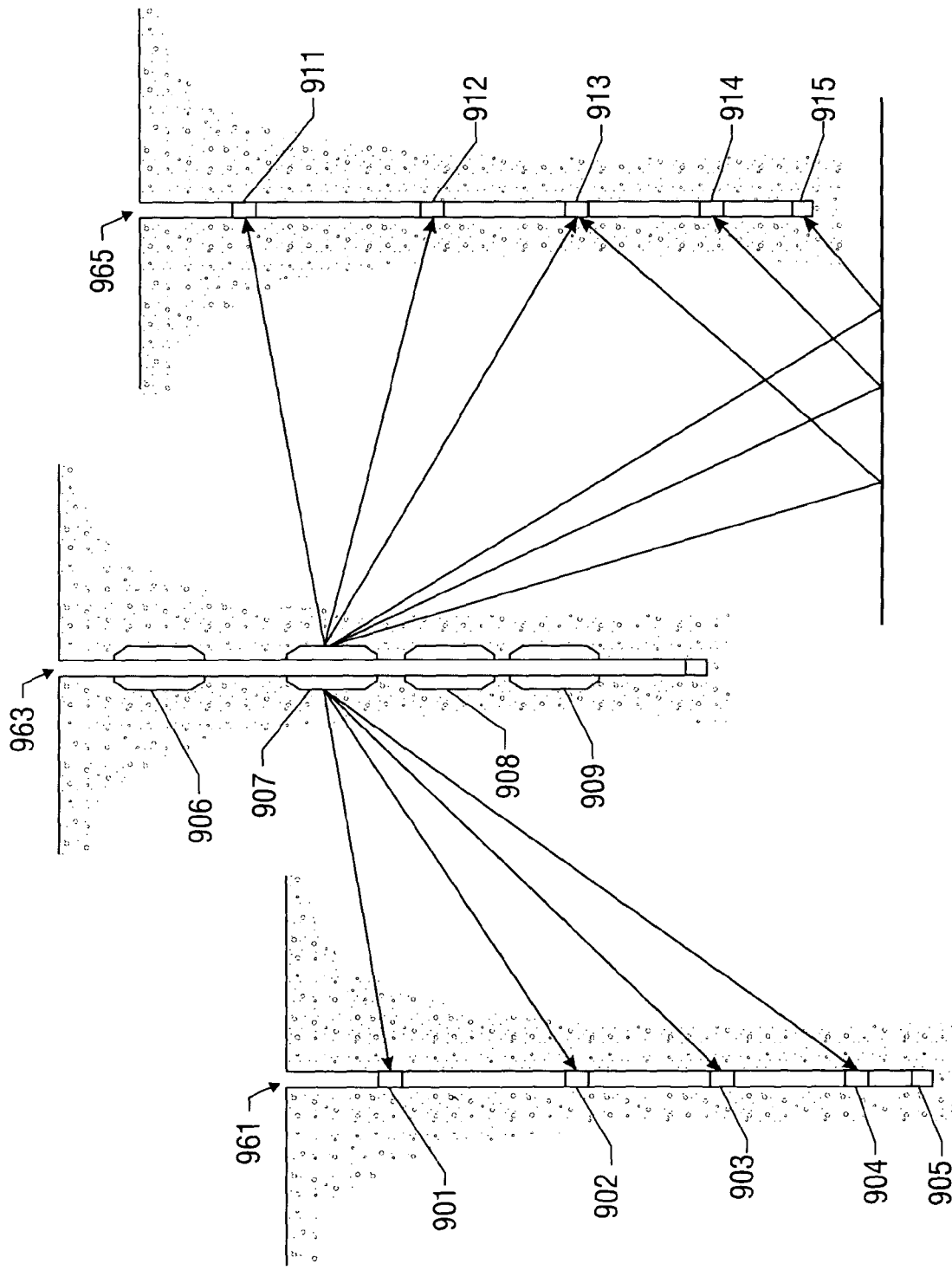
FIG. 6 is a schematic of a Multi-Well Cross-Well application type project utilizing one embodiment of the invention.

The cross-well tomography may be a multi-well project so that many boreholes (a plurality of wellbores) may be utilized to simultaneously record body wave energy emanating from a source well 963 as shown in FIG. 6. The source well 963 will have source points 906, 907, 908 and 909 for example, which may be resonant cavity sources. Receiver wells 961, 965 will contain receivers along the well bores 901 through 905, and 911 through 915 respectively. As in the FIG. 5 example, some or each of the receivers may be associated with resonant cavities in the receiver wells, since the receiver wells may also be utilized as source wells. Example body wave ray paths are shown originating at source point 907. The ray paths may be direct as shown between the source well 963 and receiver well 961. The ray paths may be combinations of reflected energy off of a geologic interface 950 with direct ray paths as shown by energy emanating at source well 963 and being received by receiver well 965.

After the receivers or acoustic sensors have received the signals, signal-processing methods well known in the art may be applied to the data. These methods may use processors such as computers and algorithms known in the art, for example cross-well methods.

As the foregoing examples demonstrate, this method may be used for hydrocarbon or other mineral deposit assessment at any point in time, over several time periods, and may be utilized as an ongoing part of the management and monitoring of a producing reservoir. Time varying changes of selected attributes of acoustic waves that have transited the earth formation between boreholes are indicative of the temporal changes in the mineral content. In one aspect, this invention allows for constant or periodic assessment of production and resource management during the productive life of oil, gas or other mineral deposits. Hydrocarbon migration during production, hydrocarbon migration during operations such as secondary recovery, steam flood progression, water invasion into oil and gas reservoirs are all examples of reservoir processes that may be monitored over time. Analysis methods include tomographic reconstruction and mapping a position of a fluid interface within the formation.

Persons skilled in the art will understand that the system and methods for generating and measuring seismic energy, and monitoring subsurface mineral deposits as described herein a examples that are not limited to the particular embodiments disclosed. Further, it should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. An apparatus for producing seismic energy in an earth formation, comprising:
    a cavity in the apparatus; and
    a drive source in fluid communication with the cavity, the drive source configured to inject fluid under pressure into the cavity to generate pressure waves in said cavity, the cavity producing seismic waves in the earth formation in response to the pressure waves, wherein the fluid circulates from the drive source to the cavity and back to the drive source in a closed loop manner, wherein the cavity and drive source are configured to be disposed in a wellbore.

2. The apparatus of claim 1 wherein said drive source is configured to generate pressure waves at a selected resonance frequency of said cavity.

3. The apparatus of claim 1 wherein said drive source includes at least one of (i) a rotary valve, (ii) an electro-solenoid oscillator, and (iii) a pump.

4. The apparatus of claim 1 wherein said drive source for generating pressure waves is activated in a range of predetermined frequencies to create a swept frequency signal input.

5. The apparatus of claim 4 wherein said swept frequency signal input is at least one of: i) an upsweep, ii) a downsweep, iii) a nonlinear sweep, a psuedo-random sweep and iv) a random sweep.

6. The apparatus of claim 1 further comprising seismic sensors configured to record said produced seismic waves.

7. The apparatus of claim 1 wherein said fluid is at least one of: (i) a liquid, and (ii) a gas.

8. The apparatus of claim 1 wherein said cavity is shaped to provide a broad frequency signal for said seismic waves in said earth formation.

9. The apparatus of claim 1 wherein said fluid comprises a smart fluid.

10. The apparatus of claim 9 further comprising at least one coil provided adjacent said cavity, said coil configured to provide an excitation field for said smart fluid in said cavity when energized.

11. The apparatus of claim 10 wherein an effective length of said smart fluid in said cavity can be controlled by selectively energizing said coil.

12. The apparatus of claim 11 wherein said at least one coil includes a plurality of segments, each of which can be separately energized.

13. The apparatus of claim 10 wherein said at least one coil is configured to provide an adjustable magnitude of intensity for said excitation field.

14. The apparatus of claim 10 further comprising a control unit operably coupled with one of said drive source and said coil.

15. The apparatus of claim 14 further comprising at least one sensor connected to said control unit, said at least one sensor configured to measure a selected parameter of interest.

16. The apparatus of claim 15 wherein said elected parameter of interest is selected from a group consisting of (i) pressure, (ii) temperature, (iii) seismic energy, (iv) flow rate, and (v) frequency of pressure signals generated by said drive source.

17. The apparatus of claim 15 wherein said control unit is configured to adjust said drive source in response to a measurement provided by said at least one sensor.

18. The apparatus of claim 1 further comprising a control unit operable coupled with said drive source.

19. The apparatus of claim 18 further comprising at least one sensor connected to said control unit, said at least one sensor configured to measure a selected parameter of interest.

20. The apparatus of claim 19 wherein said selected parameter of interest is selected for a group consisting of (i) pressure, (ii) temperature, (iii) seismic energy, (iv) flow rate, and (v) frequency of pressure signals produced by said drive source.

21. The apparatus of claim 19 wherein said control unit is configured to adjust said drive source in response to a measurement provided by said at least on sensor.

22. The apparatus of claim 1 further comprising a tubular positioned in the wellbore configured to convey a fluid to a surface location, and wherein the cavity is configured to be positioned external to the tubular.

23. The apparatus of claim 1 further comprising a fluid reservoir and a pump, wherein the fluid circulates from the reservoir to pump and from the pump to the cavity, wherein the drive source is configured to inject fluid pulses at a selected pressure to generate the pressure waves in the cavity.

24. A method for producing seismic energy in an earth formation, comprising:
    conveying an apparatus including a cavity in a wellbore;
    injecting a fluid under pressure into the cavity with a drive source in the apparatus to generate pressure pulses in the cavity such that the cavity produces seismic waves in an adjacent earth formation; and
    circulating the fluid from the drive source to the cavity and back to the drive source in a closed loop manner, wherein the fluid is injected into the cavity and is circulated from the drive source to the cavity in the wellbore.

25. The method of claim 24 wherein the fluid is injected in a manner that causes the cavity to resonate.

26. The method of claim 25 wherein the drive source includes at least one of (i) a rotary valve, (ii) an electro-solenoid oscillator, and (iii) a pump.

27. The method of claim 24 wherein the fluid comprises a smart fluid.

28. The method of claim 27 further comprising providing an excitation field for the smart fluid in the cavity using at least one coil.

29. The method of claim 28 further comprising controlling an effective length of the smart fluid in the cavity by selectively energizing the at least one coil.

30. The method of claim 28 wherein the at least one coil includes a plurality of segments, each of which can be separately energized.

31. The method of claim 27 further comprising controlling the injection of the fluid with a control unit.

32. The method of claim 31 wherein the injection is controlled in response to a measured parameter of interest.

33. The method of claim 32 wherein the measured parameter of interest is selected from a group consisting of (i) pressure, (ii) temperature, (iii) seismic energy, (iv) flow rate, and (v) frequency of pressure signals produced by the drive source.

34. The method of claim 24 further comprising a controlling the injection of the fluid with a control unit.

35. The method of claim 24 further comprising positioning the cavity external to a tubular configured to convey a fluid to a surface location.

36. The method of claim 24 further comprising circulating the fluid from a reservoir to pump and from the pump to the cavity wherein the pressure pulses are generated by the drive source injecting fluid pulses at a selected pressure.

* * * * *